(12) United States Patent
Kim

(10) Patent No.: US 12,491,914 B2
(45) Date of Patent: Dec. 9, 2025

(54) APPARATUS FOR DETERMINING A TRAFFIC LIGHT, SYSTEM HAVING THE SAME AND METHOD THEREOF

(71) Applicants: Hyundai Motor Company, Seoul (KR); Kia Corporation, Seoul (KR)

(72) Inventor: Jun Soo Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 356 days.

(21) Appl. No.: 17/708,885

(22) Filed: Mar. 30, 2022

(65) Prior Publication Data
US 2023/0061098 A1    Mar. 2, 2023

(30) Foreign Application Priority Data
Aug. 27, 2021   (KR) .......................... 10-2021-0114283

(51) Int. Cl.
*B60W 60/00*    (2020.01)
*B60W 30/18*    (2012.01)
*G08G 1/09*     (2006.01)

(52) U.S. Cl.
CPC .. *B60W 60/0027* (2020.02); *B60W 30/18154* (2013.01); *G08G 1/091* (2013.01); *B60W 2520/04* (2013.01); *B60W 2552/05* (2020.02); *B60W 2552/53* (2020.02); *B60W 2554/4029* (2020.02); *B60W 2554/4041* (2020.02); *B60W 2554/4044* (2020.02);
(Continued)

(58) Field of Classification Search
CPC ..... B60W 30/18154; B60W 30/18159; B60W 60/0027; B60W 2520/04; B60W 2520/06; B60W 2552/05; B60W 2552/53; B60W 2554/4029; B60W 2554/4044; B60W 2554/4046; B60W 2554/4041; B60W 2555/60; B60W 2556/40; B60W 2556/45; G06V 20/56; G06V 20/58; G06V 20/582; G06V 20/588; G06V 20/584; G08G 1/0112; G08G 1/012; G08G 1/0129; G08G 1/0133; G08G 1/0141; G08G 1/056; G08G 1/091; G08G 1/095; G08G 1/097; G08G 1/166; G08G 1/09623; G08G 1/09626; H04L 69/40; H04W 4/40
See application file for complete search history.

(56) References Cited

U.S. PATENT DOCUMENTS 8,793,046 B2 * 7/2014 Lombrozo ............ B60W 40/00
                                                      701/23
10,983,523 B2    4/2021 Sim
(Continued)

FOREIGN PATENT DOCUMENTS

KR    10-2019-0042205 A    4/2019

*Primary Examiner* — Brandon Z Willis
(74) *Attorney, Agent, or Firm* — Morgan Lewis & Bockius LLP

(57) ABSTRACT

A traffic light determining apparatus, a system including the same, and a method thereof, includes: a processor configured to obtain traffic light status information of an intersection while a vehicle is driven, and when obtaining the traffic light status information is not possible, configured to estimate the traffic light status information according to surrounding vehicle information or pedestrian information; and a storage configured to store data and algorithms driven by the processor.

19 Claims, 6 Drawing Sheets

(52) U.S. Cl.
CPC . *B60W 2554/4046* (2020.02); *B60W 2555/60* (2020.02); *B60W 2556/40* (2020.02); *B60W 2556/45* (2020.02)

(56) References Cited

U.S. PATENT DOCUMENTS

| | | | |
|---|---|---|---|
| 2002/0070880 A1* | 6/2002 | Dotson | G08G 1/087 340/901 |
| 2008/0162027 A1* | 7/2008 | Murphy | B60W 50/14 701/1 |
| 2017/0032675 A1* | 2/2017 | Sakai | G08G 1/161 |
| 2019/0113925 A1* | 4/2019 | Sim | G01C 21/3848 |
| 2023/0175863 A1* | 6/2023 | Kitahara | G01C 21/3885 701/400 |
| 2023/0373517 A1* | 11/2023 | Adiprasito | B60W 50/02 |

* cited by examiner

APPARATUS FOR DETERMINING A TRAFFIC LIGHT, SYSTEM HAVING THE SAME AND METHOD THEREOF

CROSS-REFERENCE TO RELATED APPLICATION

The present application claims priority to Korean Patent Application No. 10-2021-0114283, filed on Aug. 27, 2021, the entire contents of which is incorporated herein for all purposes by this reference.

BACKGROUND OF THE INVENTION

Field of the Invention

The present invention relates to a traffic light determining apparatus, a system including the same, and a method thereof, and more particularly, to a technique for correcting traffic light information when an autonomous vehicle enters an intersection.

Description of Related Art

When driving in a downtown area, autonomous vehicles recognize traffic light information at intersections in advance and control driving in response to the traffic light information. Conventionally, information related to a traffic light in front may be recognized in advance through a front camera in a complex downtown area, or may be received from nearby vehicles through Vehicle to Everything (V2X) communication. However, when a vehicle stops past a stop line of an intersection, traffic light status information may not be collected through a front camera, and there may be cases in which the traffic light status information may not be collected due to an abnormality in V2X communication.

In the instant case, there is a problem in that it is difficult for an autonomous driving vehicle to control autonomous driving because it is impossible to know accurate traffic light status information.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a traffic light determining apparatus, a system including the same, and a method thereof, configured for improving stability of autonomous driving at an intersection by estimating traffic light status information based on information related to surrounding vehicle or pedestrian in a case where it is difficult to obtain traffic light information when an autonomous vehicle enters the intersection.

The technical objects of the present invention are not limited to the objects mentioned above, and other technical objects not mentioned may be clearly understood by those skilled in the art from the description of the claims.

Various aspects of the present invention are directed to providing a traffic light determining apparatus including: a processor configured to obtain traffic light status information of an intersection while a vehicle is driven, and when obtaining the traffic light status information is not possible, configured to estimate the traffic light status information according to surrounding vehicle information or pedestrian information; and a storage configured to store data and algorithms driven by the processor.

In various exemplary embodiments of the present invention, the processor may determine whether there is a vehicle traveling in a direction which is perpendicular to the vehicle among surrounding vehicles at the intersection in front of the vehicle when V2X communication is not possible in a situation in which the vehicle is stopped in front of a stop line of the intersection.

In various exemplary embodiments of the present invention, the processor may estimate that a red light is turned on as a traffic light status at a side of the vehicle when the surrounding vehicles drive in a direction which is perpendicular to the vehicle.

In various exemplary embodiments of the present invention, the processor may determine behavior of a front vehicle when V2X communication is impossible in a situation in which the vehicle is stopped behind the front vehicle at the intersection.

In various exemplary embodiments of the present invention, the processor may estimate that a straight left traffic light is turned on as a traffic light status at a side of the vehicle when the front vehicle starts driving straight ahead or turning left.

In various exemplary embodiments of the present invention, the processor may estimate that a straight left traffic light is turned on as a traffic light status at a side of the vehicle when the front vehicle starts driving straight ahead or turning left in a situation in which a vehicle in a direction which is perpendicular to the vehicle is stopped.

In various exemplary embodiments of the present invention, the processor may determine whether there is a pedestrian walking in a crosswalk in front of the vehicle when V2X communication is impossible in a situation in which the vehicle is stopped in front of a stop line of the intersection.

In various exemplary embodiments of the present invention, the processor may estimate that a red light is turned on as a traffic light status at a side of the vehicle when there is the pedestrian.

In various exemplary embodiments of the present invention, the processor may obtain traffic light status information from a sensing device of the vehicle, or obtains the traffic light status information based on V2X communication.

In various exemplary embodiments of the present invention, the processor, in a case where the traffic light status information is latest updated information when the vehicle enters the intersection, may match the traffic light status information to traffic light information on a map.

In various exemplary embodiments of the present invention, the processor may determine whether traffic light status information pre-stored before entering the intersection exists in a case where the traffic light status information is not latest updated information when the vehicle enters the intersection.

In various exemplary embodiments of the present invention, the processor, in a case where the traffic light status information is not the latest updated information when the vehicle enters the intersection and there is no traffic light status information pre-stored before entering the intersection, may estimate the traffic light status information based on the surrounding vehicle information or the pedestrian information.

In various exemplary embodiments of the present invention, the processor may match the traffic light status information stored before entering the intersection to traffic light information on a map.

In various exemplary embodiments of the present invention, the processor may transmit the traffic light status information to a vehicle control device before the vehicle enters the intersection.

In various exemplary embodiments of the present invention, the processor, when the vehicle enters the intersection, may determine whether a remaining time of a turned-on traffic light in the traffic light status information is valid.

In various exemplary embodiments of the present invention, the processor may estimate the traffic light status information based on the surrounding vehicle information or the pedestrian information when the remaining time of the turned-on traffic light in the traffic light status information is not valid.

Various aspects of the present invention are directed to providing a vehicle system including: a sensing device configured to obtain status information of a front traffic light; a communication device configured to receive traffic light status information based on V2I communication; and a traffic light determining apparatus configured to estimate the traffic light status information according to surrounding vehicle information or pedestrian information when obtaining the traffic light status information through the sensing device or the communication device is not possible.

In various exemplary embodiments of the present invention, it may further include a vehicle control device configured to control a vehicle by receiving the traffic light status information from the traffic light determining a parking apparatus.

Various aspects of the present invention are directed to providing a traffic light determining method including: obtaining traffic light status information while a vehicle drives; and estimating the traffic light status information according to surrounding vehicle information or pedestrian information when obtaining the traffic light status information is not possible.

In various exemplary embodiments of the present invention, the estimating of the traffic light status information may include determining whether there is a vehicle traveling in a direction which is perpendicular to the vehicle among surrounding vehicles at an intersection in front of the vehicle when V2X communication is not possible in a situation in which the vehicle is stopped in front of a stop line of the intersection.

According to the present technique, it is possible to improve stability of autonomous driving at an intersection by estimating traffic light status information based on information related to surrounding vehicle or pedestrian in a case where it is difficult to obtain traffic light information when an autonomous vehicle enters the intersection.

Furthermore, various effects which may be directly or indirectly identified through the present specification may be provided.

The methods and apparatuses of the present invention include other features and advantages which will be apparent from or are set forth in more detail in the accompanying drawings, which are incorporated herein, and the following Detailed Description, which together serve to explain certain principles of the present invention.

Figure 1:
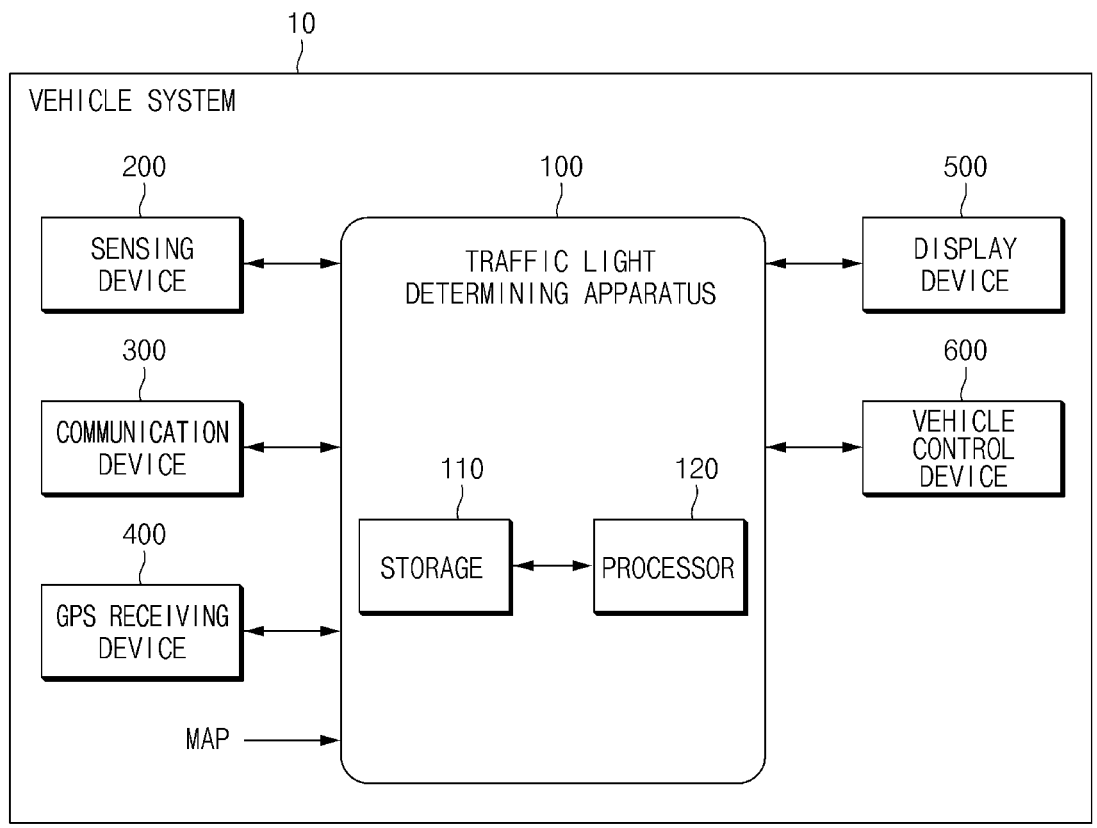
FIG. 1 illustrates a block diagram showing a configuration of a vehicle system including a traffic light information determining apparatus according to various exemplary embodiments of the present invention.

It may be understood that the appended drawings are not necessarily to scale, presenting a somewhat simplified representation of various features illustrative of the basic principles of the present invention. The predetermined design features of the present invention as disclosed herein, including, for example, predetermined dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, some exemplary embodiments of the present invention will be described in detail with reference to exemplary drawings. It should be noted that in adding reference numerals to constituent elements of each drawing, the same constituent elements include the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms include the same meanings as those which are generally understood by those skilled in the technical field to which various exemplary embodiments of the present invention pertains (those skilled in the art) unless they are differently defined. Terms defined in a generally used dictionary shall be construed to include meanings matching those in the context of a related art, and shall not be construed to include idealized or excessively formal meanings unless they are clearly defined in the exemplary embodiment of the present invention.

Hereinafter, various exemplary embodiments of the present invention will be described in detail with reference to FIG. 1 to FIG. 5.

FIG. 1 illustrates a block diagram showing a configuration of a vehicle system including a traffic light information determining apparatus according to various exemplary embodiments of the present invention.

Referring to FIG. 1, the vehicle system according to the exemplary embodiment of the present invention may include a traffic light determining apparatus 100, a sensing device 200, a communication device 300, a Global Positioning System (GPS) receiving device 400, a display device 500, and a vehicle control device 600.

The traffic light determining apparatus 100 according to the exemplary embodiment of the present invention may be implemented inside a vehicle. In the instant case, the traffic light determining apparatus 100 may be integrally formed with internal control units of the vehicle, or may be implemented as a separate device to be connected to control units of the vehicle by a separate connection means.

The traffic light determining apparatus 100 may obtain traffic light status information at a predetermined time interval before the vehicle enters a stop line of an intersection. That is, the traffic light determining apparatus 100 may obtain the traffic light status information from image data obtained by photographing a front traffic light using a front camera of the sensing device 200.

Furthermore, the traffic light determining apparatus 100 may receive a MAP and a signal phase and timing (SPAT) message through V2I communication. In the instant case, when the vehicle enters the intersection, the MAP and SPAT message may be received depending on a road position. The SPAT message may include traffic light lighting status information and remaining time information. The MAP is position path information to which the SPAT message is matched.

The traffic light determining apparatus 100 may obtain the traffic light status information of the intersection during vehicle driving, and when it is impossible to obtain the traffic light status information, may estimate the traffic light status information based on surrounding vehicle information or pedestrian information.

Referring to FIG. 1, the traffic light determining apparatus 100 may include a storage 110 and a processor 120.

The storage 110 may store sensing results of the sensing device 200 and data and/or algorithms required for the processor 120 to operate, and the like. As various exemplary embodiments of the present invention, the storage 110 may store image data photographed by a front camera, data received based on V2I communication, and the like.

The storage 110 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 120 may be electrically connected to the storage 110, etc., may electrically control each component, and may be an electrical circuit that executes software commands, performing various data processing and calculations described below.

The processor 120 may process a signal transferred between components of the relates to the traffic light determining apparatus 100, and may perform overall control such that each of the components can perform its function normally.

The processor 120 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 120 may obtain the traffic light status information of the intersection during vehicle driving, and when obtaining the traffic light status information is not possible, may estimate the traffic light status information based on surrounding vehicle information or pedestrian information.

When the V2X communication is not possible when the vehicle is stopped in front of a stop line of an intersection, the processor 120 may determine whether there is a vehicle traveling in a direction which is perpendicular to the vehicle (left and right crossing) among surrounding vehicles at the intersection in front of the vehicle.

When the surrounding vehicles drive in the direction perpendicular to the vehicle, the processor 120 may estimate that a red traffic light is turned on as a traffic light status at a side of the vehicle.

Furthermore, the processor 120 may determine behavior of a front vehicle when V2X communication is not possible when the vehicle is stopped behind the front vehicle at the intersection. Accordingly, the processor 120 may estimate that a straight left traffic light is turned on as the traffic light status at the side of the vehicle when the front vehicle starts driving straight ahead or turning left.

Furthermore, the processor 120 may estimate that a straight left traffic light is turned on as the traffic light status at the side of the vehicle when the front vehicle starts driving straight ahead or turning left in a situation in which the vehicle in the direction perpendicular to the vehicle is stopped.

Furthermore, when the V2X communication is not possible in a situation in which the vehicle is stopped in front of the stop line of the intersection, the processor 120 may determine whether there is a pedestrian walking in a crosswalk in front of the vehicle.

When there is the pedestrian, the processor 120 may estimate that a red light is turned on as a traffic light status at the side of the vehicle.

The processor 120 may obtain traffic light status information from the sensing device 200 of the vehicle, or may obtain traffic light status information of surrounding infrastructure (e.g., traffic lights, surrounding vehicles, etc.) based on V2X communication (including V2X and V2I communication).

The processor 120 may match the traffic light status information with traffic light information on the map in the case where the traffic light status information is the latest updated information when the vehicle enters the intersection.

The processor 120 may determine whether traffic light status information pre-stored before entering the intersection exists in the case where the traffic light status information is not the latest updated information when the vehicle enters the intersection.

In the case where the traffic light status information is not the latest updated information when the vehicle enters the intersection and there is no traffic light status information stored before entering the intersection, the processor 120 may estimate the traffic light status information based on surrounding vehicle information or pedestrian information.

The processor 120 may match the traffic light status information pre-stored before entering the intersection with the traffic light information on the map.

The processor 120 may transmit the traffic light status information to the vehicle control device 600 before the vehicle enters the intersection. Accordingly, the vehicle control device 600 may perform autonomous driving control, etc. by use of the received traffic light status information.

When the vehicle enters the intersection, the processor 120 may determine whether a remaining time of the turned-on traffic light in the traffic light status information is valid. That is, the processor 120 may determine whether the remaining time of the previous traffic light status information is currently valid when entering the intersection. For example, if the remaining time of the traffic light status information received 10 s ago is 5 s, the current remaining time may be determined as invalid information.

Accordingly, when the remaining time of the turned-on traffic light in the traffic light status information is invalid, the processor 120 may estimate a traffic light status based on information related to surrounding vehicles or pedestrians.

The sensing device 200 may obtain status information of a traffic light in front. To the present end, the sensing device 200 may include a front camera for photographing the traffic light in front.

The communication device 300 is a hardware device implemented with various electronic circuits to transmit and receive signals through a wireless or wired connection, and may transmit and receive information based on in-vehicle devices and in-vehicle network communication techniques. As various exemplary embodiments of the present invention, the in-vehicle network communication techniques may include controller area network (CAN) communication, Local Interconnect Network (LIN) communication, flex-ray communication, Ethernet communication, and the like.

Furthermore, the communication device 300 may perform communication by use of a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, Worldwide Interoperability for Microwave Access (WiMAX), V2X communication (V2V, V2I, etc.), or the like. Furthermore, short-range communication technique may include Bluetooth, ZigBee, ultra wideband (UWB), radio frequency identification (RFID), infrared data association (IrDA), and the like.

For example, the communication device 300 may receive traffic light information from a traffic light based on the V2I communication.

The GPS receiving device 400 may receive a GPS signal and may provide it to the traffic light determining apparatus 100, so that the traffic light determining apparatus 100 may determine a current position of the vehicle. Furthermore, precise map information may be inputted to the traffic light determining apparatus 100.

The display device 500 may include an input means for receiving a control command from a user and an output means for outputting an operation state of the apparatus 100 and results thereof. Herein, the input means may include a key button, and may further include a mouse, a joystick, a jog shuttle, a stylus pen, and the like. Furthermore, the input means may further include a soft key implemented on the display. As various exemplary embodiments of the present invention, the display device 500 may display traffic light status information, autonomous driving status information, and the like.

The display device 500 may be implemented as a head-up display (HUD), a cluster, an audio video navigation (AVN), a human machine interface (HM), a user setting menu (USM), or the like.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the instant case, the display may include at least one of a liquid crystal display (LCD), a thin film transistor liquid crystal display (TFT LCD), an organic light emitting diode display (OLED display), a flexible display, a field emission display (FED), or a 3D display.

The vehicle control device 600 may control the vehicle based on the traffic light status information of the traffic light determining apparatus 100. As various exemplary embodiments of the present invention, the vehicle control device 600 may include an autonomous driving control device or the like.

Accordingly, according to various exemplary embodiments of the present invention, it is possible to improve safety of intersection driving by ensuring continuity of processing traffic light information of an autonomous vehicle.

Figure 2:
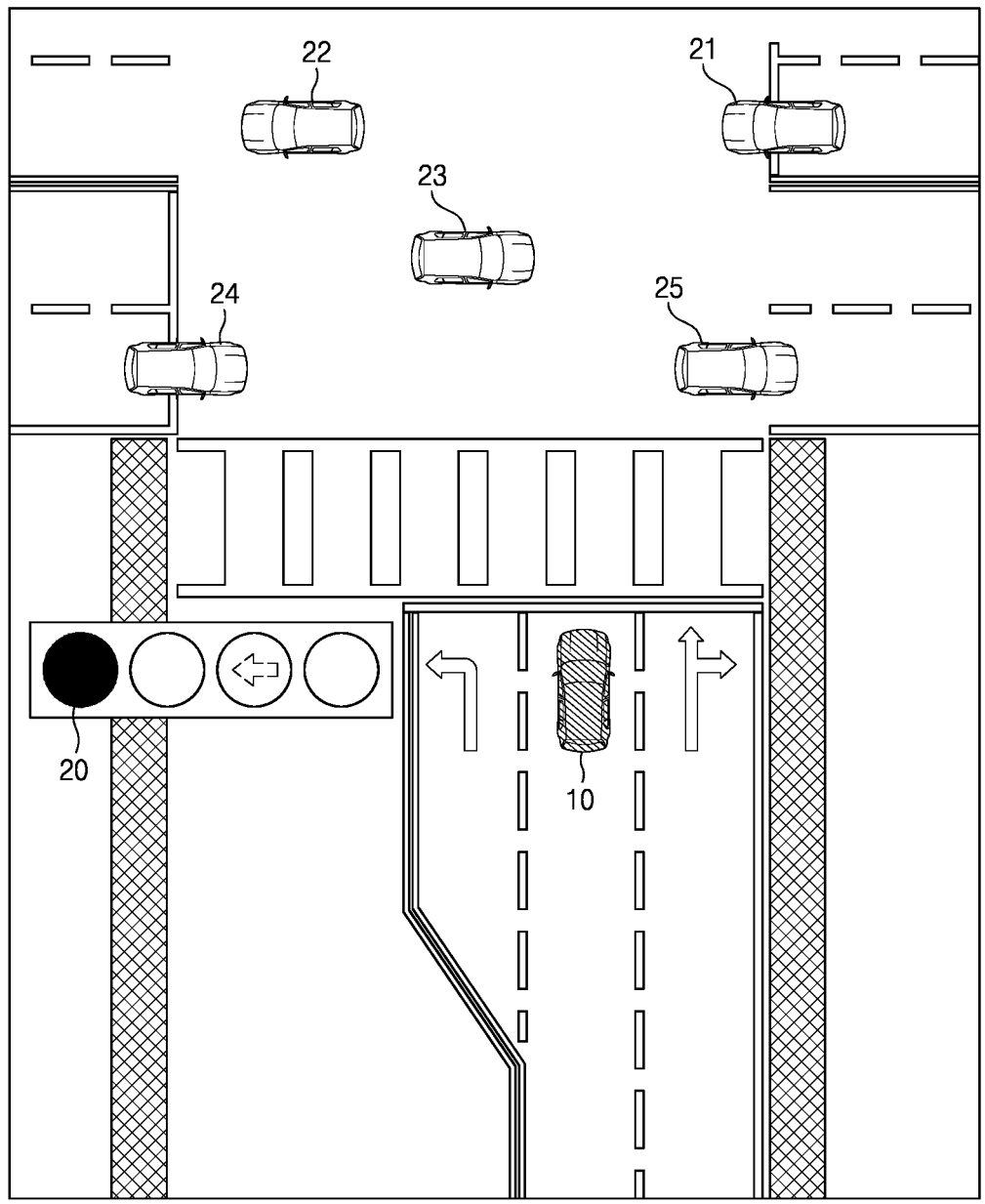
FIG. 2, FIG. 3 and FIG. 4 illustrate a screen for describing a traffic light information correcting process of a traffic light determining apparatus according to various exemplary embodiments of the present invention.
Figure 3:
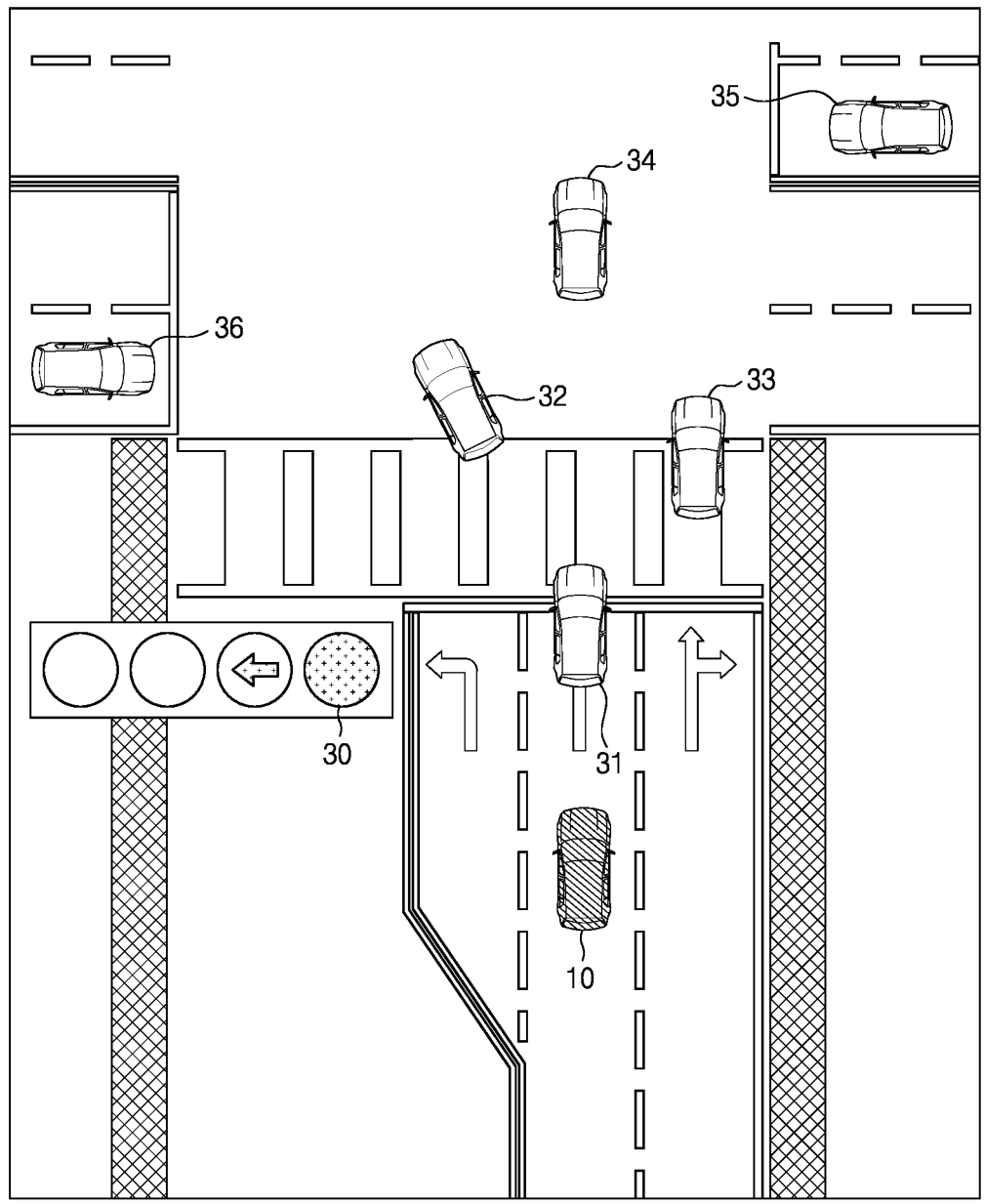
Figure 4:
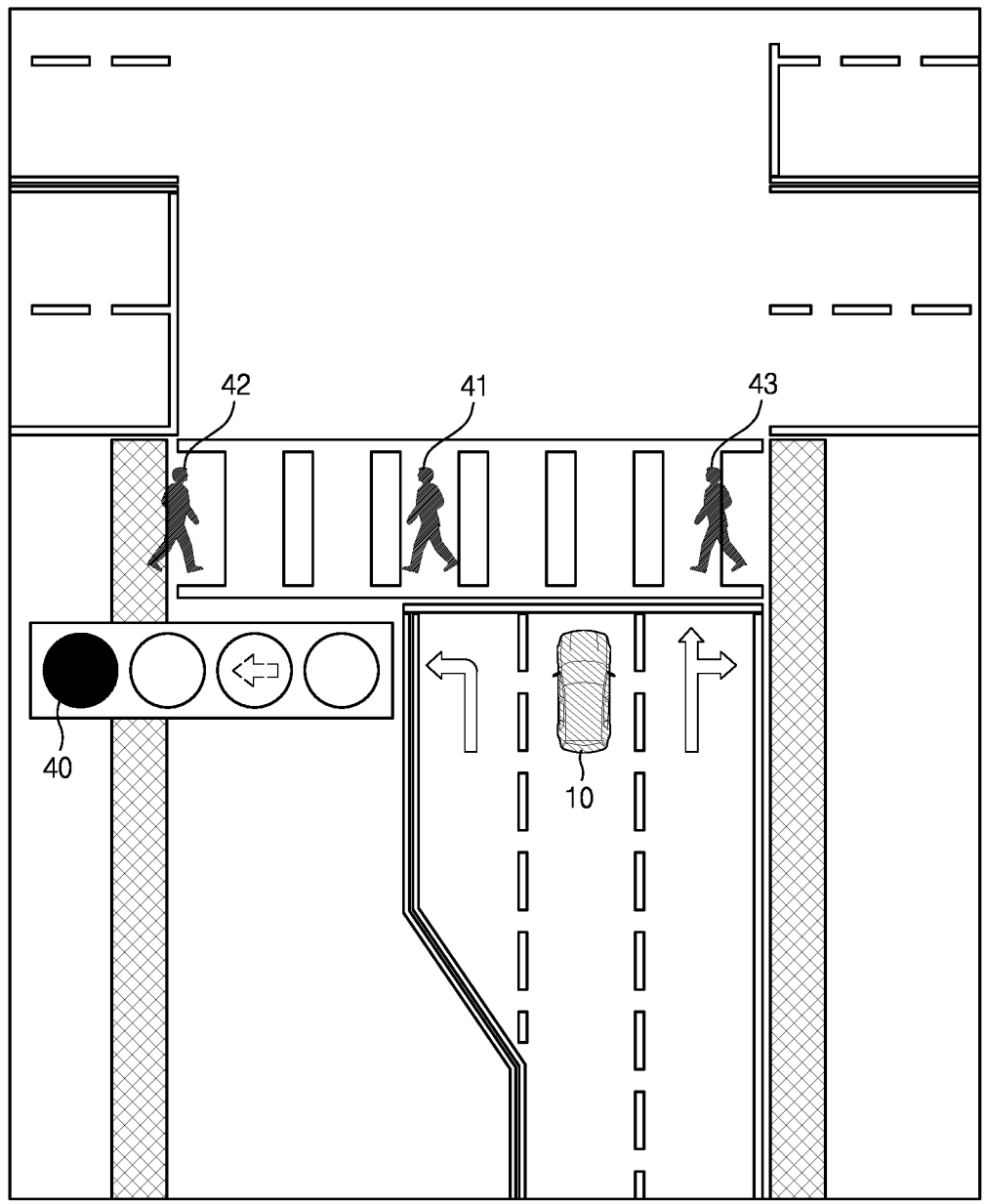

FIG. 2, FIG. 3 and FIG. 4 illustrate a screen for describing a traffic light information correcting process of a traffic light determining apparatus according to various exemplary embodiments of the present invention.

Referring to FIG. 2, the traffic light determining apparatus 100 may estimate a traffic light status based on surrounding vehicle information.

A vehicle may receive information related to traffic lights by performing V2I communication with infrastructure at a predetermined distance before entering an intersection. However, once the vehicle enters the intersection, it will no longer receive information from the traffic lights. That is, the current vehicle is set to receive information by communicating only before entering the intersection, and no longer receive traffic light information when entering the intersection.

Referring to FIG. 2, the traffic light determining apparatus 100 may estimate the traffic light status based on surrounding vehicle information when status information is unable to be received due to a V2X communication problem and a traffic light status cannot be recognized by the front camera in a situation in which the host vehicle 10 is stopped in front of a stop line thereof.

First, the traffic light determining apparatus 100 of the host vehicle 10 may check whether vehicles 21, 22, 23, 24, and 25 cross left and right at an intersection in front of the host vehicle 10. When the vehicles 21, 22, 23, 24, and 25 cross at the intersection in front thereof, the traffic light determination apparatus 100 may estimate that a red light 20 is turned on as a status of the traffic light. Furthermore, the traffic light determining apparatus 100 may estimate the remaining time of the red traffic light 20 by use of a traffic light operation sequence and activation time data of the intersection, known in advance. For example, when it knows in advance information that the traffic light of the intersection operates in the order of red (60 s)→left turn (10 s)→go straight (60 s), it may be estimated that the remaining time is 60 s immediately after the red light is turned on.

In the instant case, the traffic light determining apparatus 100 may estimate the remaining time of the red light when obtaining information related to a starting time of the left and right crossings of the vehicles 21, 22, 23, and 24 in front of the intersection.

However, when obtaining no information related to the starting time of the left and right crossing of the vehicles 21, 22, 23, and 24 in front of the intersection, the traffic light determining apparatus 100 may estimate the remaining time by recognizing a starting time of lighting of the traffic light which is newly turned on at a time when a status of the currently turned-on traffic light is switched to a next status.

Referring to FIG. 3, the traffic light determining apparatus 100 may estimate a lighting status of the traffic light based on the surrounding vehicle information when there is a V2X communication problem and the traffic light is not able to be recognized by the front camera in the situation where the vehicle 10 is stopped behind the vehicle 31 in front at the intersection.

The traffic light determining apparatus 100 determines behavior of the vehicles in front of the host vehicle 10, that is, vehicles 31, 32, 33, and 34 in a same direction as the host vehicle 10, and behavior of left and right crossing vehicles 35 and 36. The traffic light determining apparatus 100 may estimate the status of the traffic light as the status in which a straight left traffic light 30 is turned on when the front vehicles 31, 32, 33, and 34 go straight or start turning left when the left and right crossing vehicles 35 and 36 are stopped.

Accordingly, the traffic light determining apparatus 100 may estimate a remaining time of a straight left traffic light of the host vehicle 10 by use of a traffic light operation sequence and activation time data of the intersection, known in advance.

Referring to FIG. 4, the traffic light determining apparatus 100 may estimate the traffic light status based on pedestrian information when status information is unable to be received due to a V2X communication problem and a traffic light status cannot be recognized by the front camera in a situation in which the host vehicle 10 is stopped in front of a stop line of the intersection.

The traffic light determining apparatus 100 may determine whether pedestrians 41, 42, and 43 cross a crosswalk in front of the host vehicle 10.

When the pedestrians 41, 42, and 43 cross the crosswalk in front of the host vehicle 10, the traffic light determining apparatus 100 may estimate the traffic light of the host vehicle as a status in which a red light 40 is turned on. Furthermore, the traffic light determining apparatus 100 may estimate a remaining time of a red traffic light of the host vehicle 10 by use of a traffic light operation sequence and activation time data of the intersection, known in advance.

Figure 5:
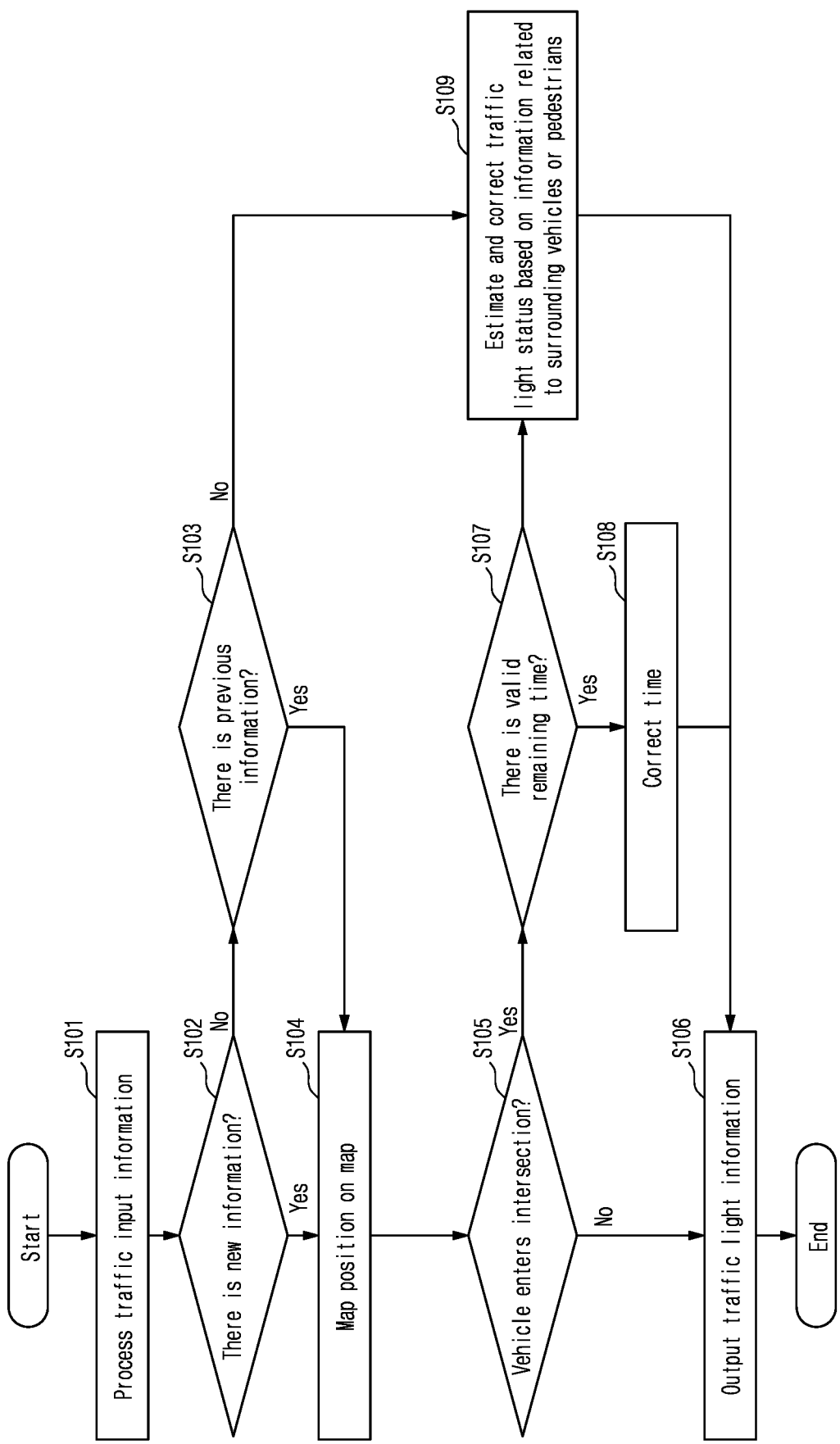
FIG. 5 illustrates a flowchart showing traffic light information correcting process when an autonomous vehicle enters an intersection according to various exemplary embodiments of the present invention.

Hereinafter, a traffic light determining method according to various exemplary embodiments of the present invention will be described in detail with reference to FIG. 5. FIG. 5 illustrates a flowchart showing traffic light information correcting process when an autonomous vehicle enters an intersection according to various exemplary embodiments of the present invention.

Hereinafter, it is assumed that the traffic light determining apparatus 100 of FIG. 1 performs a process of FIG. 5. Furthermore, in the description of FIG. 5, operations referred to as being performed by a device may be understood as being controlled by the processor 120 of the traffic light determining apparatus 100.

Referring to FIG. 5, the traffic light determining apparatus 100 may input and process traffic light status information (S101). That is, the traffic light determining apparatus 100 may obtain lighting status information of a front traffic light and a relative position value through the front camera of the sensing device 200. Furthermore, the traffic light determining apparatus 100 may receive a MAP message and a SPAT message from the traffic light depending on a position of a road through which it enters an intersection adjacent to a host vehicle through V2I communication.

The traffic light determining apparatus 100 determines whether the traffic light status information of the intersection is new information before entering the intersection (S102). The traffic light determining apparatus 100 may determine whether the traffic light status information is new information by determining whether it is currently received information.

When traffic light input information is not new information, the traffic light determining apparatus 100 may determine whether there is previously stored traffic light status information for the traffic light of the corresponding intersection (S103).

When the traffic light input information is new information or there is the previous information, the traffic light determining apparatus 100 may input the traffic light status information to the traffic light information existing on a precise map to map it (S104). In other words, data types of the traffic light status information are different depending on the front camera, which is a source that provides the traffic light status information, and the V2I communication.

Next, the traffic light determining apparatus 100 may determine whether the vehicle enters the intersection (S105), and when it does not enter the intersection, may output currently received traffic light information to the vehicle control device 600 (S106). In the instant case, when the vehicle enters within a predetermined distance from the intersection or stops at a stop line of the intersection, the traffic light determination apparatus 100 may determine that the vehicle has entered the intersection.

When the vehicle enters the intersection, the traffic light determining apparatus 100 may determine whether the remaining time of the traffic light is valid based on the traffic light status information (S107), that is, the traffic light determining apparatus 100 may determine whether there is a valid remaining time of the traffic light based on the traffic light status information obtained just before entering the intersection. For example, when the remaining time of the traffic light obtained just before entering the intersection (e.g., 5 s before) is 10 s, the traffic light determination apparatus 100 may determine that the remaining time is valid because the remaining time is valid, and may determine that the remaining time is valid, apply it to the traffic light status information, and transmit it to the vehicle control device 600 (S108).

On the other hand, when the remaining time of the traffic light obtained just before entering the intersection (e.g., 5 s before) is 3 s, the remaining time has been already counted and the remaining time becomes invalid. Accordingly, it is determined that the remaining time is not valid, and the traffic light determining apparatus 100 may estimate the traffic light status based on information related to surrounding vehicles or pedestrians (S109).

Accordingly, according to various exemplary embodiments of the present invention, it is possible to estimate the corresponding traffic light status information based on surrounding vehicle information or pedestrian information when it is impossible to recognize the traffic light status by a front camera due to entering an intersection during autonomous driving, and it is impossible to obtain the traffic light status information due to a V2I communication problem.

Figure 6:
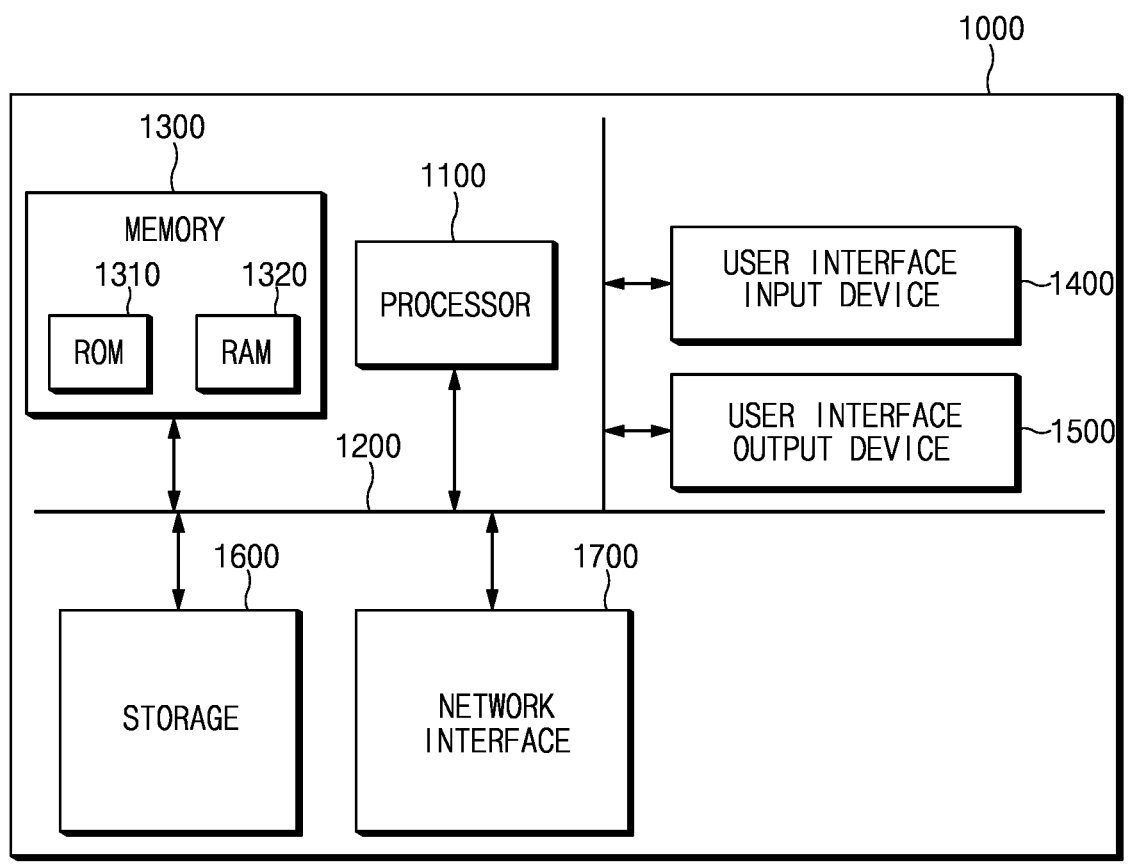
FIG. 6 illustrates a determining system according to various exemplary embodiments of the present invention.

FIG. 6 illustrates a computing system according to various exemplary embodiments of the present invention.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A traffic light determining apparatus including:
a processor configured to obtain traffic light status information of an intersection while a host vehicle is driven, and when obtaining the traffic light status information is not possible, configured to estimate the traffic light status information according to surrounding vehicle information or pedestrian information; and
a storage configured to store data and algorithms driven by the processor,
wherein the processor is configured to estimate a remaining time of a traffic light status by use of a traffic light operation sequence and activation time data of the intersection,
wherein the processor is further configured to:
estimate a remaining time of a red light in the traffic light status information when obtaining information related to a starting time of left and right crossings of a vehicle traveling in a direction which is perpendicular to the host vehicle among surrounding vehicles at the intersection in front of the host vehicle, and
estimate the remaining time of the traffic light status by recognizing a starting time of lighting of a traffic light which is newly turned on at a time when a status of a currently turned-on traffic light is switched to a next status, when obtaining no information related to the starting time of the left and right crossings, and
wherein the processor is further configured to control the host vehicle based on the received traffic light status information.

2. The traffic light determining apparatus of claim 1, wherein the processor is configured to determine whether there is a vehicle traveling in the direction which is perpendicular to the host vehicle among the surrounding vehicles at the intersection in front of the host vehicle when Vehicle to Everything (V2X) communication is not possible in a situation in which the host vehicle is stopped in front of a stop line of the intersection.

3. The traffic light determining apparatus of claim 2, wherein the processor is configured to estimate that the red light is turned on as the traffic light status at a side of the host vehicle when the surrounding vehicles drive in the direction which is perpendicular to the host vehicle.

4. The traffic light determining apparatus of claim 1, wherein the processor is configured to determine behavior of a front vehicle when V2X communication is impossible in a situation in which the host vehicle is stopped behind the front vehicle at the intersection.

5. The traffic light determining apparatus of claim 4, wherein the processor is configured to estimate that a straight left traffic light is turned on as the traffic light status at a side of the host vehicle when the front vehicle starts driving straight ahead or turning left.

6. The traffic light determining apparatus of claim 4, wherein the processor is configured to estimate that a straight left traffic light is turned on as the traffic light status at a side of the host vehicle when the front vehicle starts driving straight ahead or turning left in a situation in which a vehicle in the direction which is perpendicular to the host vehicle is stopped.

7. The traffic light determining apparatus of claim 1, wherein the processor is configured to determine whether there is a pedestrian walking in a crosswalk in front of the host vehicle when V2X communication is impossible in a situation in which the host vehicle is stopped in front of a stop line of the intersection.

8. The traffic light determining apparatus of claim 7, wherein the processor is configured to estimate that the red light is turned on as the traffic light status at a side of the host vehicle when there is the pedestrian.

9. The traffic light determining apparatus of claim 1, wherein the processor is configured to obtain the traffic light status information from a sensing device of the host vehicle, or to obtain the traffic light status information based on V2X communication.

10. The traffic light determining apparatus of claim 1, wherein in a case where the traffic light status information is latest updated information when the host vehicle enters the intersection, the processor is configured to match the traffic light status information to traffic light information on a map.

11. The traffic light determining apparatus of claim 1, wherein the processor is configured to determine whether traffic light status information pre-stored before entering the intersection exists in a case where the traffic light status information is not latest updated information when the host vehicle enters the intersection.

12. The traffic light determining apparatus of claim 11, wherein
in a case where the traffic light status information is not the latest updated information when the host vehicle enters the intersection and there is no traffic light status information pre-stored before entering the intersection, the processor is configured to estimate the traffic light status information based on the surrounding vehicle information or the pedestrian information.

13. The traffic light determining apparatus of claim 11, wherein the processor is configured to match the traffic light status information stored before entering the intersection to traffic light information on a map.

14. The traffic light determining apparatus of claim 1, wherein the processor is configured to transmit the traffic light status information to a vehicle control device before the host vehicle enters the intersection.

15. The traffic light determining apparatus of claim 14, wherein when the host vehicle enters the intersection, the processor is configured to determine whether a remaining time of the turned-on traffic light in the traffic light status information is valid.

16. The traffic light determining apparatus of claim 15, wherein the processor is configured to estimate the traffic light status information based on the surrounding vehicle information or the pedestrian information when the remaining time of the turned-on traffic light in the traffic light status information is not valid.

17. A vehicle system comprising:
a front camera configured to obtain status information of a front traffic light;
an electronic circuit configured to receive traffic light status information based on V2I communication; and
a traffic light determining apparatus configured to estimate the traffic light status information according to surrounding vehicle information or pedestrian information when obtaining the traffic light status information through the front camera or the circuit is not possible,
a vehicle control device configured to control a vehicle based on the received traffic light status information from the traffic light determining apparatus, and
wherein the traffic light determining apparatus is configured to:
estimate a remaining time of a traffic light status by use of a traffic light operation sequence and activation time data of an intersection,
estimate a remaining time of a red light in the traffic light status information when obtaining information related to a starting time of left and right crossings of a vehicle traveling in a direction which is perpendicular to a host vehicle among surrounding vehicles at the intersection in front of the host vehicle, and
estimate the remaining time of the traffic light status by recognizing a starting time of lighting of a traffic light which is newly turned on at a time when a status of a currently turned-on traffic light is switched to a next status, when obtaining no information related to the starting time of the left and right crossings.

18. A traffic light determining method including:
obtaining, by a processor, traffic light status information while a host vehicle drives; and
estimating, by the processor, the traffic light status information according to surrounding vehicle information or pedestrian information when obtaining the traffic light status information is not possible, and
controlling, by the processor, the host vehicle based on the received traffic light status information, wherein the estimating, by the processor, the traffic light status information according to surrounding vehicle information or the pedestrian information when obtaining the traffic light status information is not possible includes:
estimating, by the processor, a remaining time of a traffic light status by use of a traffic light operation sequence and activation time data of an intersection; and
estimating, by the processor, a remaining time of a red light in the traffic light status information when obtaining information related to a starting time of left and right crossings of a vehicle traveling in a direction which is perpendicular to the host vehicle among surrounding vehicles at the intersection in front of the host vehicle; and
estimating, by the processor, the remaining time of the traffic light status by recognizing a starting time of lighting of a traffic light which is newly turned on at a time when a status of a currently turned-on traffic light is switched to a next status, when obtaining no information related to the starting time of the left and right crossings.

19. The traffic light determining method of claim 18, wherein the estimating of the traffic light status information includes:
determining whether there is a vehicle traveling in the direction which is perpendicular to the host vehicle among the surrounding vehicles at the intersection in front of the host vehicle when Vehicle to Everything (V2X) communication is not possible in a situation in which the host vehicle is stopped in front of a stop line of the intersection.

* * * * *